United States Patent
Voorman et al.

(10) Patent No.: US 7,286,655 B2
(45) Date of Patent: Oct. 23, 2007

(54) SERVICE ACCOUNTING SYSTEM AND METHOD

(75) Inventors: Alwyn Johannes Voorman, Delft (NL); Phaedra Zoe Goedele Mensen, Amsterdam (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/674,074

(22) Filed: Sep. 29, 2003

(65) Prior Publication Data

US 2004/0114738 A1   Jun. 17, 2004

(30) Foreign Application Priority Data

Sep. 30, 2002   (EP)   ................................. 02079113

(51) Int. Cl.
*H04M 15/00*   (2006.01)
*G06Q 40/00*   (2006.01)

(52) U.S. Cl. ............................... 379/114.2; 379/114.16; 379/121.03; 705/39

(58) Field of Classification Search ........... 379/114.19, 379/114.2, 114.15, 114.16, 114.17, 121.03; 705/35, 39, 40
See application file for complete search history.

(56) References Cited

U.S. PATENT DOCUMENTS

| | | | | |
|---|---|---|---|---|
| 5,749,052 A | * | 5/1998 | Hidem et al. ............... | 455/406 |
| 5,825,863 A | * | 10/1998 | Walker ..................... | 379/114.2 |
| 5,991,749 A | * | 11/1999 | Morrill, Jr. .................. | 705/44 |
| 6,163,272 A | * | 12/2000 | Goode et al. ................. | 725/30 |
| 6,529,593 B2 | * | 3/2003 | Nelson ..................... | 379/114.2 |
| 6,665,387 B2 | * | 12/2003 | Hannu .................... | 379/114.16 |
| 6,760,417 B1 | * | 7/2004 | Wallenius .............. | 379/114.28 |
| 2002/0091572 A1 | * | 7/2002 | Anderson et al. ............. | 705/16 |
| 2003/0078031 A1 | * | 4/2003 | Masuda ..................... | 455/406 |
| 2003/0078844 A1 | * | 4/2003 | Takatori et al. ................ | 705/17 |
| 2005/0021458 A1 | * | 1/2005 | Rowe .......................... | 705/39 |

FOREIGN PATENT DOCUMENTS

| | | |
|---|---|---|
| WO | WO 01/06753 | 1/2001 |
| WO | WO 01/86933 | 11/2001 |
| WO | WO 02/11460 | 2/2002 |

* cited by examiner

*Primary Examiner*—Binh K. Tieu
(74) *Attorney, Agent, or Firm*—Michaelson & Associates; Peter L. Michaelson

(57) ABSTRACT

The present invention is related to a service accounting system containing one or more classified service accounts, in particular for mobile/cellular services. More specifically, a service accounting system connected to a main accounting system, part of a main account being transferable to a service account, and the use thereof are described. The invention provides a solution to deal with the accounting of differentiated services. In particular, a solution is provided to give users control over their expenses on a differentiated service basis. Also for service providers, a solution is provided to take actions on a differentiated services account basis.

21 Claims, 1 Drawing Sheet

SERVICE ACCOUNTING SYSTEM AND METHOD

FIELD OF THE INVENTION

The present invention is related to a service accounting system containing one or more service accounts, in particular for mobile/cellular communication services. More specifically, a service accounting system connected to a main accounting system, part of a main account being transferable to a service account, and the use thereof are disclosed.

BACKGROUND OF THE INVENTION

With the existing emerging differentiation in mobile communication services, such as the differentiation in voice connections, data transportation, portal access and content access in mobile data communication systems, users of these services loose insight and control over what is being paid for which service. Especially users using services on a prepaid basis feel the need to control their expenses. On the other hand there is a need by service providers to control the balance of differentiated services and take specific actions per differentiated service. These service providers can be different parties.

A common way to use and pay for communication services today is to have one main account from which all services are paid for. For example in a mobile communications system suitable for GSM (speech) and GPRS (data) this main account can be a prepaid account from which the user pays for conversations, data transportation, access to mobile internet portals such as an i-mode portal and access to paid content services such as a paid website for weather information. If the main account has insufficient balance the user is unable to use any service. This could even mean that upgrading the balance on the main account is not possible using the communication system.

The prior art document WO02/11460 describes a method for enabling a second set of services and disabling a first set of services when the balance for the first set of services reaches a minimum limit. By having a service for upgrading the balance in the second set of services the user will be able to upgrade the balance on the main account, even though the balance of the main account is insufficient to use the first set of services.

What is lacking in the prior art document of WO02/11460 is a method to differentiate services into differentiated service accounts in order to give users better control over what is being paid for which service, and to be able to start specific actions when the balance of a specific service reaches a predefined limit.

WO01/86933 describes a method and a system for operating a communications infrastructure on a pre-payment basis. In WO01/86933 when a pre-payment subscriber joins the network, the current credit amount for the subscriber is distributed as credit values between user-specific virtual purses each associated with a respective metered resource. Upon use of a metered resource by the subscriber, the credit value held in the associated purse is correspondingly reduced, with use of the resource being dependent on the purse being in credit. The virtual purses are preferably electronically distributed to be close by the metered resources to which they relate whereby to reduce network billing traffic. When the subscriber leaves the network, the remaining credit values are consolidated from the purses.

The virtual purses of WO01/86933 are used as payment caches to improve the flexibility and responsiveness of the payment system. They cannot be used to differentiate services into differentiated service accounts in order to give users better control over what is being paid for which service, and to be able to start specific actions when the balance of a specific service reaches a predefined limit.

Problem Definition

Thus the prior art fails to disclose a solution to deal with the accounting of differentiated services. In particular there is no good solution to give users insight and control over what is paid for which differentiated service. Also for service providers there is no good solution to take actions on a differentiated service account basis.

Aim of the Invention

The aim of the invention is to provide a solution to deal with the accounting of differentiated services. In particular a solution is provided to give users control over their expenses on a differentiated service basis. Also to service providers a solution is to be provided to take actions on a differentiated services account basis.

SUMMARY OF THE INVENTION

The present invention provides a solution to deal with the accounting of differentiated services. In particular a solution is provided to give users insight and control over their expenses on a differentiated service basis. Also to service providers a solution is provided to take actions on a differentiated services account basis.

In the present invention a service accounting system is connected to a main accounting system. The service accounting system comprises one or more service accounts, which can be used for differentiated services, optionally comprising a classification. The main accounting system comprises a main account, which can be a postpaid or prepaid account. Through use of the classification, a predetermined part of the main account can be transferred to the service account. The classification can be such that any part of the main account can be transferred. In this case the transferable part can be set manually for example.

The service accounting system can be arranged for transmitting a recharging request to the main accounting system. The recharging request comprises a requested amount of money, which can be determined by the classification. The recharging request can be transmitted when the service account reaches a predefined level such as a minimum level, but it is also possible that other situations lead to a recharging request such as reaching a predefined point of time. A recharging request can even be transmitted on an end user request, i.e. manually.

The service account can have a non-monetary balance, i.e. a balance of something other then money such as an integer value representing an amount of kilobytes. The non-monetary balance can be calculated from a monetary balance, i.e. consisting of an amount of money, transferred from the main account to the service account.

In case a service account has insufficient balance or the main account has insufficient balance, the service accounting system can take actions based on the classification, i.e. take specific actions per service account. A specific action can be the disallowance of usage of a service associated with the classification.

In case there are two or more service accounts, the service accounts can comprise a priority identification making it possible to deal with the service accounts in the order of their priority.

The invention also relates to the methods used in the service accounting system.

DETAILED DESCRIPTION OF THE INVENTION

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being limited only by the appended claims as finally granted.

Figure 1:
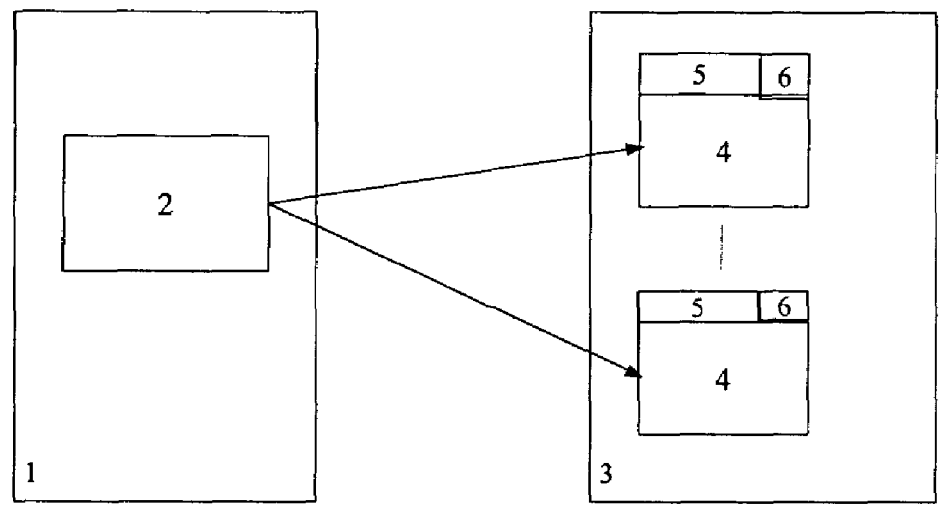
FIG. 1 represents an example of a system according to the present invention.

FIG. 1 shows an example of a system according to the invention.

A main accounting system (1) comprises a main account (2). This main account (2) can be a postpaid account, i.e. the balance of the account is upgraded after using paid services. This main account (2) can also be a prepaid account, i.e. the balance of the account has to be sufficient or else upgraded prior to using paid services. The main account (2) is the account all services are paid from.

Prior to the present invention the services would be paid for directly from the main account. In the present invention this is not the case. Therefore the main accounting system (1) is connected to a service accounting system (3). This service accounting system (3) contains at least one service account (4). This service account (4) is used for classified services and can be identified by a classification (5). With the existing emerging differentiation in services, such as the differentiation in data transportation, portal access and content access in mobile data communication systems, it is preferable that each of these differentiated services has a unique classification and service account. The services can be paid for from the corresponding service accounts. In case a service is not part of a classified service account it is still possible to use the main account directly. According to an embodiment of the present invention the service accounts can have a priority identification (6) making it possible to deal with the service accounts in the order of their priority.

As an example the situation as described above will be worked out in more detail. Assume there is a user in a prepaid mobile communications system suitable for speech (GSM) and data (GPRS). This user has to pay separately for voice communications via GSM, data transportation via GPRS, access to a mobile internet portal such as an i-mode portal and access to paid content services such as a paid website for weather information. In this example the main account (2) is a prepaid account. Prior to using the telecommunications system the user upgraded the balance on the prepaid account (2). Three classes of services (5) are defined: one for GPRS data transportation, one for access to the i-mode portal and one for access to paid content services. Each of the services (4) belonging to the classes (5) will be paid for from the corresponding service account (4). Voice communications via GSM will be paid for directly from the main prepaid account (2).

To be able to use the classified services the user has to transfer part of the main prepaid account (2) to the service accounts (4). This can be done manually or automatically. It is likely that for the i-mode portal a fixed price per month has to be paid. For such a service money could be transferred from the prepaid account (2) to the i-mode portal service account (4) automatically on the first day of the month by transmitting a recharging request to the main accounting system (1). As an extra service to the user a notification of recharging can be sent via SMS or email. The amount of money requested can be determined by the classification (5) of the service account (4). It could be possible that the user wishes to pay for more then one month in advance, in which case manually recharging should be possible as well. For some content services the user might wish not to use them anymore. Therefore for these content classified services manually transference of money from the prepaid account (2) to the service account (4) is desirable. Data transportation is often charged for in kilobytes directly. This means that the user pays an amount of money for a certain amount of kilobytes.

These kilobytes will be added to the corresponding service account (4), so in effect money is transferred from the main prepaid account (2) to the service accounting system (3), a number of kilobytes is calculated from the transferred amount of money and a number of kilobytes is stored in the service account (4). The user can control the amount of data that can be sent and received, thus limiting the usage of mobile data communications, by manually adding the desired amount of kilobytes to the service account. It can be desirable to be able to use the data communications medium at all time. In this case a predefined minimum level of kilobytes in the service account (4) could trigger a recharging request to the main prepaid account (2), ensuring enough balance in the service account (4)

Assuming there was enough money on the main prepaid account (2) the service accounts (4) now contain enough balance to use the services. The user knows how much money or kilobytes are transferred to each service class, making it possible to control the expenses on a service class basis.

Having separate service accounts (4) per classification (5) makes it possible to take specific actions when a service account (4) has insufficient balance.

For example when the data traffic service account (4) is empty, i.e. all kilobytes are used up, the user can be denied the possibility to browse the mobile internet or send and receive emails. To notify the user access can be granted to one page only showing a message to buy kilobytes.

When the i-mode portal service account (4) is empty and recharging is not set to automatically, the user can be denied the possibility to browse the mobile internet as well in case browsing is only possible through the portal. To notify the user, access can be granted to one page only showing a message to transfer money to the i-mode portal service account (4).

Having separate service accounts (4) per classification (5) makes it also possible to take specific actions when the main prepaid account (2) has insufficient balance to transfer to one or more of the service accounts (4).

When there is insufficient balance to transfer to the data traffic service account (4) or to the i-mode portal service account (4) the user can be allowed to access only one page showing a message to upgrade the prepaid balance.

When the content services service account (4) needs recharging when the main prepaid balance is empty, the user can be denied access to the content services or the subscriptions to the content services can be terminated. Browsing the mobile internet and using email can still be possible though.

Prioritizing the service accounts (4) can make it possible to recharge service accounts (4) in a specific order. For example it can be desirable to recharge the content services service account (4) first, because subscriptions to the content services might be terminated when not able to transfer balance from the main prepaid account (2) to the service account (4). Any prioritization can be used as seems desirable.

Figure 2:
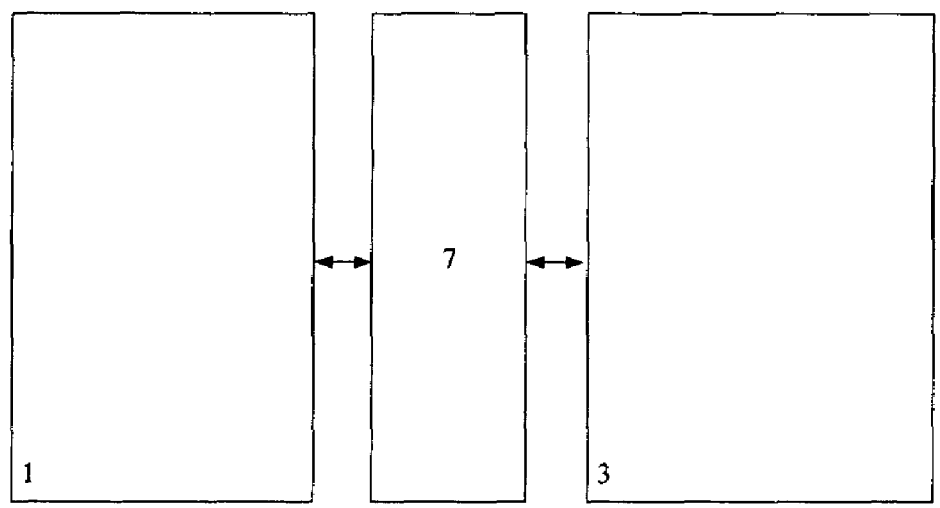
FIG. 2 represents an example of a system according to the present invention using a service mediator.

A service mediator system (7) as described in pending patent EP02076362.9 can be used to deal with providing paid services to the user and to deal with the payment, thus controlling the balance on the service accounts (4). FIG. 2 shows an example of a system including a service mediator system (7).

The service mediator system (7) can be used to handle recharging requests from the service accounting system (3) and to transfer balance from the main accounting system (1) to the service accounting system (3). Also the service mediator system (7) is able to notify a user when there is too little balance on the prepaid account.

The service mediator system (7) can perform the specific actions when a service account (4) has insufficient balance or when the main account (2) has insufficient balance.

The invention claimed is:

1. A service accounting system comprising a plurality of service accounts associated with a user, each of the service accounts having a classification associated with a corresponding service, wherein first and second ones of the service accounts have said classification associated respectively with a data transportation service and a content access service, the service accounting system being connected to a main accounting system comprising a main account associated with the user, a predetermined part of the main account being transferable to any one of the service accounts, and said part of the main account being predetermined through use of the classification associated with said any one service account.

2. The service accounting system recited in claim 1 wherein the main account is a prepaid account.

3. The service accounting system recited in claim 1 wherein the service accounting system is further arranged for transmitting a recharging request to the main accounting system, the recharging request comprising a requested amount of money, the requested amount of money being determined by the classification associated with said any one service account.

4. The service accounting system recited in claim 3 wherein said recharging request is transmitted when a balance in said any one service account reaches a predefined minimum level.

5. The service accounting system recited in claim 3 wherein said recharging request is transmitted at a predefined point of time.

6. The service accounting system recited in claim 3 wherein said recharging request is transmitted via an end user request.

7. The service accounting system recited in claim 1 wherein said any one service account has a non-monetary balance, said non-monetary balance being calculated from a monetary balance transferred from the main account to said any one service account.

8. The service accounting system recited in claim 1 wherein, when said any one service account has an insufficient balance, the service accounting system performs an action based on the classification associated with said any one service account.

9. The service accounting system recited in claim 1 wherein, when said main account has an insufficient balance for a given service, the service accounting system performs an action based on the classification associated with said given service.

10. The service accounting system recited in claim 8 wherein usage of a service is disallowed based on a classification associated with said service.

11. The service accounting system recited in claim 1 wherein each of said service accounts has a corresponding priority identification.

12. The service accounting system recited in claim 11 wherein the service accounts are dealt with in order of their corresponding priority identifications.

13. A method for use in a service accounting system, the system comprising a plurality of service accounts associated with a user, each one of the service accounts having a classification associated with a corresponding service, wherein first and second ones of the service accounts have said classification associated respectively with a data transportation service and a content access service, and the service accounting system being connected to a main accounting system comprising a main account associated with the user, the method comprising the steps of:
  determining a part of the main account through use of the classification associated with any one of the service accounts; and
  transferring said part of the main account to said any one service account.

14. A method for use in a service accounting system for a telecommunications network, the system comprising:
  maintaining a main accounting system having a plurality of main accounts for voice users of the telecommunications system, and at least a portion of the main accounts being prepaid voice accounts;
  maintaining a plurality of service accounts for users having the prepaid voice accounts, each one of the service accounts corresponding to a plurality of services that have predetermined classifications, which include at least a data transportation service classification and a content access service classification;
  connecting the service accounts to the main accounting system;
  determining the amount of money in a user's prepaid voice account;
  determining a user's usage of the classified services associated with any one of the service accounts; and
  transferring part of the money in the user's prepaid voice account to one of service accounts when there are sufficient funds in the prepaid voice account to pay the balances in the service accounts.

15. The method for use in a service accounting system for a telecommunications network according to claim 14 wherein when the prepaid account has insufficient funds to pay the balances in the service accounts, the user is notified.

16. The method for use in a service accounting system for a telecommunications network according to claim 14, wherein when the prepaid account has insufficient funds to pay the balances in the service accounts, the user is denied access to at least one of the services having a predetermined classification.

17. The method for use in a service accounting system for a telecommunications network according to claim 14, wherein the services having predetermined classification are prioritized and the service accounts are recharged in a predetermined order.

18. A service accounting system for a telecommunications network, the system comprising:
- a main accounting system having a plurality of main accounts for voice users of the telecommunications system, and at least a portion of the main accounts being prepaid voice accounts; and
- a plurality of service accounts for users having the prepaid voice accounts, each one of the service accounts corresponding to a plurality of services that have predetermined classifications, which include at least a data transportation service classification and a content access service classification;
- wherein a connection is established between the service accounting system and the main accounting system;
- wherein a determination is made of the amount of money in a user's prepaid voice account, and the user's usage of the classified services associated with any one of the service accounts; and
- wherein a transfer is made of part of the money in the user's prepaid voice account to one of service accounts when there are sufficient funds in the prepaid voice account to pay the balances in the service account.

19. The service accounting system for a telecommunications network according to claim 18 wherein when the prepaid account has insufficient funds to pay the balances in the service accounts, the user is notified.

20. The service accounting system for a telecommunications network according to claim 18, wherein when the prepaid account has insufficient funds to pay the balances in the service accounts, the user is denied access to at least one of the services having a predetermined classification.

21. The service accounting system for a telecommunications network according to claim 19, wherein the services having predetermined classification are prioritized and the service accounts are recharged in a predetermined order.

* * * * *